United States Patent Office 3,374,718
Patented Mar. 26, 1968

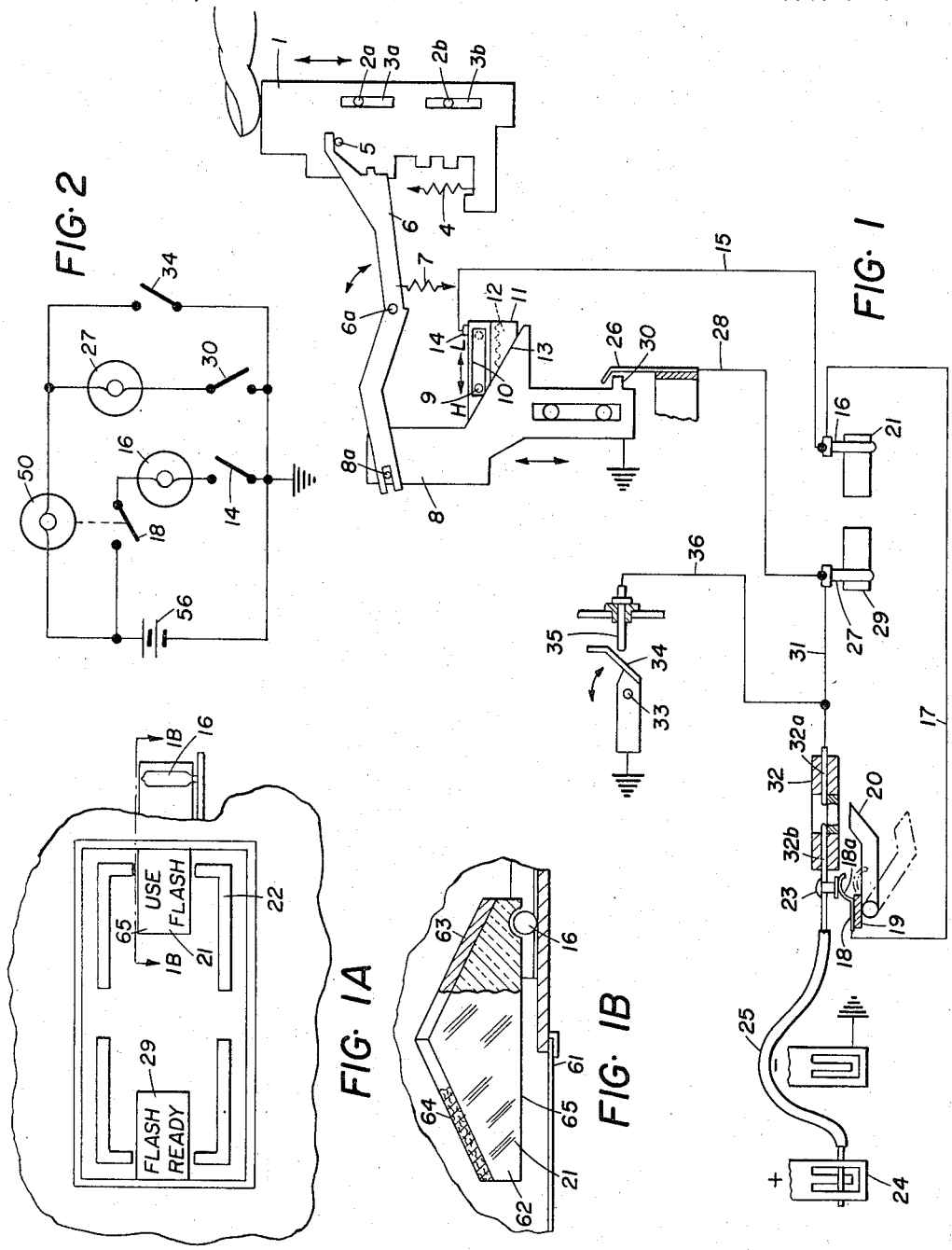

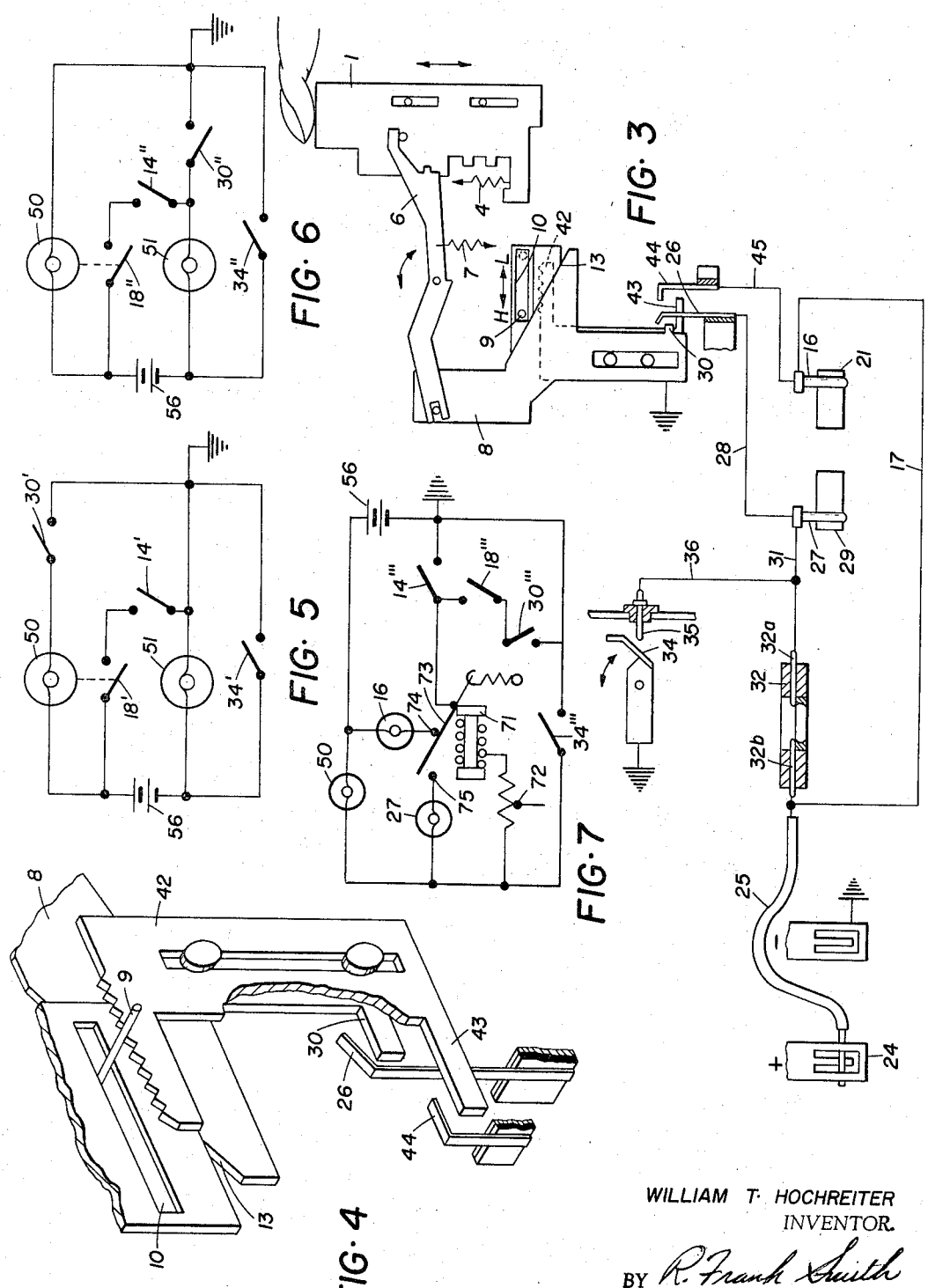

3,374,718
LOW LIGHT AND FLASH INDICATOR
FOR CAMERAS
William T. Hochreiter, Rochester, N.Y., assignor to Eastman Kodak Company, Rochester, N.Y., a corporation of New Jersey
Filed Mar. 4, 1965, Ser. No. 437,221
11 Claims. (Cl. 95—10)

ABSTRACT OF THE DISCLOSURE

A signal in the viewfinder warns the operator when a flashbulb is required. A second signal indicates whether an inserted flashbulb is good. The apparatus includes a movable meter needle and a sensing cam which closes the circuit to the first signal when the shutter release slide is partially depressed and the needle is in the low scene brightness region. Partial depression of the slide also closes the circuit to the second signal if a flashbulb is in position and if it is a good flashbulb.

---

The present invention relates to photographic cameras having automatic exposure control systems, and more particularly relates to means for indicating low scene brightness in such cameras as well as to means for testing a flash lamp prior to using same.

Numerous devices have been proposed in the past for warning the operator when the scene brightness is less than a predetermined value. Many signals of this type, however, depend upon the scene light itself for illumination, resulting in a failure of light intensity at precisely the time when a reliable signal is required.

It is therefore a primary object of this invention to provide a reliable means for indicating when scene illumination has fallen below a predetermined level, said means being powered by a source independent of the scene illumination.

It is a further object of this invention to control the energization of a visual signal in a camera by means of an automatic exposure control system in such camera.

An additional object is to provide means whereby such visual signal is displayed in the viewfinder of a camera.

A still further object of this invention is to provide means whereby a flash bulb may be tested prior to actuation of such bulb.

An additional object is to provide a visual means indicating that a flash bulb is in proper working condition, such means being displayed in the viewfinder of a camera.

These objectives have been attained in the present invention by providing a mechanism which is responsive to manual depression of a camera body release and which automatically indicates to the operator when supplemental light is necessary for a given scene condition and in addition tests a flash lamp prior to use.

Other objects of the invention will appear from the following description, reference being made to the accompanying drawings, wherein:

FIG. 1 is a schematic view of the basic elements of a photographic camera embodying one form of the present apparatus;

FIG. 1A is a partial frontal view of a viewfinder incorporating elements of the present invention;

FIG. 1B is an enlarged, partial sectional view taken along line 1B—1B of FIG. 1A in the direction of the arrows;

FIG. 2 is an electrical circuit diagram for the modification of the invention shown in FIG. 1;

FIG. 3 is a schematic view of the basic elements of a photographic camera embodying an alternative form of the present invention;

FIG. 4 is a partial sectional view of the modification shown in FIG. 3;

FIGS. 5, 6 and 7 are electrical circuit diagrams for other modifications of the invention.

Referring to FIG. 1, a typical camera embodying the invention has a manually operable body release slide 1 which is mounted for reciprocatable motion on a camera housing wall (not shown) in any suitable manner, such as by pegs 2a and 2b extending through slots 3a and 3b, respectively. The body release slide 1 is biased in an upward direction by spring 4 which is attached to the camera housing in any suitable fashion. Bearing against a peg 5, which is carried by body release slide 1, is one end of an actuating lever 6. Actuating lever 6 is pivoted for movement about pin 6a which extends outwardly from the camera housing wall. Spring 7, also attached to the camera housing wall, biases actuating lever 6 in a clockwise direction. The other end of actuating lever 6 is keyed to a meter sensing cam 8 by means of stud 8a, thereby causing sensing cam 8 to move in an upward direction in response to the depression of body release slide 1.

The moving needle 9 of a galvanometric device (not shown) which is part of the camera's conventional photoresponsive circuitry, protrudes through slot 10 in a mounting plate 11 and is positioned as a function of scene brightness. Needle 9 is constructed of steel or some other electrically conductive material.

The moving needle 9 of a galvanometric device (not shown) which is part of the camera's conventional photoresponsive circuitry, protrudes through slot 10 in a mounting plate 11 and is positioned as a function of scene brightness. Needle 9 is constructed of steel or some other electrically conductive material.

Disposed behind the mounting plate 11 is a meter clamping slide 12 which is mounted for movement with the meter sensing cam in a manner which is shown in U.S. Patent 3,125,939, granted Mar. 24, 1964 to J. J. Bundschuh et al. As is more fully disclosed in the aforesaid patent, meter clamping slide 12 moves upwardly with sensing cam 8 until its upper surface traps the meter needle 9. Meter sensing cam 8 still continues to move upwardly thereafter until its cam surface 13 contacts meter needle 9 in the manner well known in the art. Actuating lever 6 then stops its rotation about pin 6a thus allowing peg 5 to move away from actuating lever 6 as body release slide 1 continues to be depressed toward its shutter actuating position.

Whenever low scene light conditions are encountered, meter needle 9 moves to the position indicated by the dotted lines in the manner well known in the art. Disposed above this region of slot 10 is a low ambient light indicator control contact 14 which is connected through wire lead 15 to a microminiature lamp 16 which is in turn connected through wire lead 17 to the movable contact 18 of a normally closed switch. Microminiature lamp 16 is secured to a light pipe 21 which is constructed of plastic material such as plexiglas or other light conducting material. Light pipe 21 extends into the field of view of the viewfinder of the camera.

The operation of the light pipe may more readily be seen with reference to FIGS. 1A and 1B. A reticle 22 is superimposed on a conventional viewfinder window 61 in any suitable fashion such as by etching, painting, etc. Disposed behind window 61 are light pipes 21 and 29 having suitable markings thereon for notifying the operator of the precise condition encountered.

As may more clearly be seen with reference to FIG. 1B, light pipe 21 consists of a substantially triangular, transparent block 62. A metallic or other reflective surface 63 is applied to one side of the block in opposition to microminiature lamp 16. A matte surface 64 is provided on an adjacent side of block 62. Upon actuation of microminiature lamp 16, light reflects from reflective surface 63 and is emitted through indicator face 65 of block 62, indicating to the operator that flash means is necessary to supplement the scene light. The matte surface 64 diffuses the light transmitted through the light pipe and provides a nonglare backing for the light emitted from indicator face 65. It is of course obvious that construction of light pipe 29 is identical to that of light pipe 21.

The switch contact 18 rests upon a bed of insulated material 19 and is securely fastened to pivoted switch actuating member 20 which is biased in a counterclockwise direction by any suitable means (not shown) for the purpose to be hereinafter described.

The curved portion 18a of switch contact 18 when in normal closed position abuts against the lower face of a contact stud 23 which is connected to power source terminal 24 through wire lead 25. Power source terminal 24 is connected in the conventional manner to the batteries customarily used to furnish power for the flash assembly.

Disposed adjacent to the sensing cam 8 and adapted to be contacted by element 30 on said cam upon upward movement thereof is a cam switch contact 26 secured to the camera housing wall by any suitable insulating means. Cam switch contact 26 is connected to microminiature lamp 27 through wire lead 28. Lamp 27 is similar to microminiature lamp 16 and is similarly connected to a light pipe 29 which extends into the field of view of the viewfinder. Wire lead 31 connects microminiature lamp 27 to a bulb contact element 32a embedded in a conventional flash bulb socket 32. A bulb contact element 32b is also embedded in socket 32 in opposed relation to contact element 32a. Bulb contact elements 32a, 32b are adapted to contact the terminals of a flash bulb in the conventional manner. Wire lead 25 connects bulb contact element 32b to power source terminal 24.

Pivoted upon a camera housing wall upon a pin 33 attached thereto is a shutter flash switch contact 34 which is actuated by any suitable linkage to be operated simultaneously with the camera shutter mechanism (not shown) in the conventional manner. An insulated terminal element 35 is contacted by said shutter flash switch contact upon clockwise movement thereof and is connected by wire lead 36 to lead 31.

The mode of operation of the above-described indicator system will now be explained.

Upon depression of body release slide 1 by the operator, meter sensing cam 8 and associated meter clamping slide 12 will move in an upward direction as described above. If the meter needle 9 is at the low ambient light end of slot 10 it will be clamped against switch contact 14. A circuit is then completed enabling current to flow from power source terminal 24 through switch contact 18, lamp 16, indicator switch contact 14, through the electrically conductive meter needle to the grounded clamping slide 12. The bulb 16 is then energized to indicate to the operator that a flash is needed for proper lighting.

In the event sufficient scene light is present to take a photograph, the meter needle will be clamped in a portion of the slot 10 not occupied by switch contact 14. The circuit will then remain open and lamp 16 will not be energized.

Assuming, however, that microminiature signal lamp 16 has been energized and the operator has been advised to use a flash, a bulb will then be inserted in the customary manner in flash bulb socket 32. A portion of the bulb will then protrude through the socket to push down switch actuating member 20 to the position indicated by the dotted lines thereby opening normally closed switch contact 18. The circuit through lamp 16 will then be opened and the microminiature signal lamp 16 deenergized. A wiring diagram illustrating the circuit used in this modification is shown in FIG. 2. In the wiring diagram a flash bulb 50 is shown in position with the various switches being shown in open position.

Continued upward movement of meter sensing cam 8 will cause element 30 to contact insulated cam switch contact 26. A circuit will then be completed and current will flow from power terminal 24, through the flash bulb mounted in socket 32, through microminiature lamp 27, and through cam switch contact 26 to the grounded meter sensing cam 8. Bulb 27 will then be energized, indicating to the operator that a flash bulb in good working order has been inserted in socket 32. The microminiature lamp 27 has sufficient resistance to prevent the flash from firing.

If the flash bulb which has been inserted in the socket 32 is defective or has already been used, the circuit will remain open and the microminiature lamp will not be energized. The operator will then replace the defective bulb with one that will close the circuit indicating that the flash is ready.

Upon further downward movement by the body release slide 1 the grounded shutter flash switch contact 34 through a mechanical linkage (not shown) will rotate in a clockwise direction as viewed in FIG. 1 until contact is made with insulated terminal element 35. Sufficient current will now flow through the flash bulb to ignite it.

In FIGS. 3 and 4 is shown an alternative embodiment of the invention. In this modification the meter needle does not itself become a part of the low light signal circuit. As in the above modification, a meter clamping slide 42 is provided which moves upwardly with sensing cam 8 until its upper surface traps the meter needle 9. Meter clamping slide 42 differs from that disclosed in FIG. 1, however, by being reduced in width at its clamping surface. The relative positions of these parts may be more clearly seen with reference to FIG. 4. In addition, an elongated integral abutment 43 is provided at the bottom of meter clamping slide 42.

Disposed adjacent abutment 43 and having a portion extending over the topmost portion thereof is an insulated low light indicator switch contact 44 which is attached to a camera housing wall and is connected by wire lead 45 to microminiature lamp 16. Wire lead 17 is connected to the other terminal of lamp 16 and is connected directly to wire lead 25 and hence to power terminal 24. It should be noted that this arrangement also differs from that shown in FIG. 1 by the elimination of the flash bulb controlled switch and switch actuating member.

The modification disclosed in FIGS. 3 and 4 operates as follows. Upon depression of body release slide 1 the meter sensing cam 8 and meter clamping slide 42 move in an upward direction in a manner described above. If the meter needle 9 is in the intermediate or high range of slot 10, the upward movement of the meter clamping slide 42 will be halted by clamping engagement with the needle before abutment 43 contacts low light indicator switch contact 44. If, however, the needle is in the low light indicating end of slot 10, i.e., beyond the outermost extremity of clamping slide 42, the clamping slide will be free to continue unobstructed movement in an upward direction until abutment 43 makes contact with the low light indicator switch contact. At this point a circuit will be completed from power terminal 24, through microminiature lamp 16 and switch contact 44, to the grounded clamping slide. Lamp 16 will then be actuated and a visual signal will be indicated in the viewfinder by virtue of the light pipe 21 notifying the operator a flash is desired.

A flash bulb is then inserted by the operator in socket 32 with the terminals of the bulb making a connection with bulb contact elements 32a and 32b. Continued upward movement of the meter sensing cam 8 causes element 30 to contact insulated cam switch contact 26, completing the circuit through lamp 27 in precisely the same manner as described with regard to the embodiment of FIG. 1. Microminiature lamp 27 will then light to inform the operator that the flash bulb is in good working order.

Upon further depression of body release slide 1 the grounded shutter flash switch contact 34 through conventional linkage means (not shown) will be rotated in a clockwise direction until contact is made with insulated terminal element 35. Sufficient current will then flow through the flash bulb to ignite it.

FIGS. 5 and 6 illustrate various modifications of electrical circuitry which may be utilized in the operation of the present invention. In the wiring diagram of FIG. 5 is shown a circuit design utilizing one lamp 51 in the dual capacity of a low light warning means and a flash circuit check means. Battery 56, indicating lamp 51, and the low light switch contact 14' are connected with a flash lamp switch contact 18' which is opened by inserting a flash lamp or bulb 50 through any mechanical means. With the flash bulb 50 in place and the sensing cam switch element 30' in closed position, the indicating lamp 51 will light indicating that the flash circuit is complete and ready to flash. Shutter switch 34' is then closed and the flash bulb is ignited. This design can also be used by eliminating switch element 30'. Thus, when the flash lamp 50 is in contact, the indicating light 51 will light any stay lighted until the flash bulb is fired or moved.

The circuit shown in FIG. 6 differs only slightly from that shown in FIG. 5 in that the location of sensing cam switch element 30'' is removed from a series connection with the flash bulb 50 and is instead placed in series with indicator lamp 51. This change has the advantages of reducing the number of connectors and/or switches in the actual flash circuit.

The circuit shown in FIG. 7 is similar to that shown in FIG. 2 with the addition of a relay 71 and a variable resistor 72 for control of the relay. The relay is normally open and clapper 73 thereof is in contact with terminal member 74. When low light indicator switch 14''' is closed, microminiature lamp 16 signals a low light condition. If a flash is used, the flash unit closes contact 18'''. When a good lamp and sufficient battery voltage are present for proper operation, clapper 73 will close, thus making contact with terminal element 75. Microminiature lamp 27 will then light, indicating that the camera is ready for flash. If the batteries are too low or a defective bulb is used, lamp 27 will fail to light, thus indicating a defect in the flash circuit.

The invention has been described in detail with particular reference to preferred embodiments thereof, but it will be understood that variations and modifications can be effected within the spirit and scope of the invention as described hereinabove and as defined in the appended claims. For example, it is possible for an audible signal, such as a buzzer, to be installed as a substitute for, or in addition to, the lamp signal means. Alternatively, the location of the desired signal means may be placed outside the viewfinder at any desired location on the camera.

I claim:

1. In a camera, the combination comprising: a movable member whose position along a predetermined path of movement is a function of scene brightness, a first reciprocatable member operatively associated with said movable member and movable relative thereto from a first position to a second position, a mounting member having a slot therein, said movable member being movable in, said slot, an electrically operated signal means, a first energizing circuit for said signal means, a normally open first switch in said energizing circuit and comprising a contact mounted on said mounting member and clamping means responsive to the movement of said reciprocatable member for clamping said movable member into electrical contact with said contact to close said switch when said movable member is in a position corresponding to low scene light and when said first reciprocatable member is in said second position thereby causing energization of said signal means.

2. The combination according to claim 1, wherein said signal means comprises an electric light.

3. In a camera, the combination: a movable member whose position along a predetermined path of movement is a function of scene brightness, a first reciprocatable member operatively associated with said movable member and movable relative thereto from a first position to a second position, an electrically operated signal means, a first energizing circuit for said signal means, a normally open first switch in said energizing circuit, said first switch being in operative association with said movable member and first reciprocatable member, said switch being closed when said movable member is in a position corresponding to low scene light and when said first reciprocatable member is in said second position thereby causing energization of said signal means, and a second reciprocatable member movable from a first position to a second position where it engages said movable member, said second reciprocatable member having means thereon to engage a normally open second switch when in said second position, said second switch being connected to a second signal means, a second energizing circuit for said second signal means including a flashbulb socket, said second energizing circuit being energized upon the insertion of an operable flashbulb in said socket and the closing of said second switch.

4. The combination according to claim 3 wherein means is provided adjacent said socket to open said first energizing circuit upon insertion of a flashbulb.

5. The combination according to claim 3, wherein means is provided to flash said flashbulb after energization of said first and second signal means.

6. In a camera, the combination comprising a meter sensing cam mounted for reciprocatable motion and having a cam surface on the upper end thereof, a meter needle disposed above said cam surface and movable in a slot means as a function of scene light intensity, said slot means having a low light range and a high light range, a meter clamping slide disposed adjacent to said sensing cam and movable therewith, a switch disposed over said slot low light range, a signal means connected to said switch and thence to a power source, whereby upward movement of said clamping member actuates said switch by clampingly engaging said needle against said switch when the needle is in said low light range thereby energizing said signal means.

7. The combination according to claim 6, wherein a second switch means is disposed adjacent said meter sensing cam and is operatively associated with an electrical circuit including a flashbulb socket, a second signal means, and a power source, said circuit being closed and said second signal being actuated upon insertion of an operable flashbulb in said socket and the closing of said second switch upon upward movement of said meter sensing cam.

8. In a camera, the combination comprising:
photocell means responsive to the intensity of scene light for producing a first output indicative of adequate scene light and a second output indicative of inadequate scene light;
a low light signal means for producing a visible signal in the camera viewfinder;
sensing means operable to sense the output of said photocell means;
means for energizing said low-light signal means when the output sensed by said sensing means is said second output;
a second signal means for producing a visible signal in the camera viewfinder;
an energizing circuit for said second signal means including a flashbulb socket and a switch;
shutter release means; and
means responsive to partial actuation of the shutter release means to close said switch and to operate said sensing means, whereby said low-light signal means provides visual indication of a low-light condition and whereby said second signal means indicates whether an installed flashbulb is good.

9. The apparatus according to claim 8 including switch means responsive to the insertion of a flashbulb in said socket for inactivating said low-light signal means.

10. The apparatus according to claim 8 wherein said photocell means includes a meter needle movable in a slot means as a function of scene light intensity, said first output being the high-light range of said slot means and said second output being the low-light range of said slot means.

11. The apparatus according to claim 10 in which:
   said sensing means is a sensing cam mounted for reciprocative motion; and
   said energizing means includes an energizing circuit and a switch adjacent the low-light range of said slot means, said switch being closed when the sensing cam engages the needle in the low-light range of said slot means.

References Cited

UNITED STATES PATENTS

| | | | |
|---|---|---|---|
| 3,106,141 | 10/1963 | Estes | 95—10 |
| 3,125,939 | 3/1964 | Bundschuh et al. | 95—10 |
| 3,127,823 | 4/1964 | Babcock et al. | 95—10 |
| 3,250,193 | 5/1966 | Horton | 95—10 |
| 3,073,226 | 1/1963 | Greger et al. | 95—10 |
| 3,087,398 | 4/1963 | Greger et al. | 95—10 |

FOREIGN PATENTS 226,514   3/1963   Austria.

NORTON ANSHER, *Primary Examiner.*

J. F. PETERS, *Assistant Examiner.*

UNITED STATES PATENT OFFICE
CERTIFICATE OF CORRECTION

Patent No. 3,374,718                                  March 26, 1968

William T. Hochreiter

It is certified that error appears in the above identified patent and that said Letters Patent are hereby corrected as shown below:

Column 5, line 75, after "combination" insert -- comprising --.

Signed and sealed this 23rd day of September 1969.

(SEAL)
Attest:

Edward M. Fletcher, Jr.                         WILLIAM E. SCHUYLER, JR.
Attesting Officer                                     Commissioner of Patents